United States Patent [19]
Frank

[11] Patent Number: 5,411,650
[45] Date of Patent: May 2, 1995

[54] CAPTIVE VORTEX HIGH AGITATION DEVICE

[75] Inventor: Lee F. Frank, Rochester, N.Y.

[73] Assignee: Eastman Kodak Company, Rochester, N.Y.

[21] Appl. No.: 95,385

[22] Filed: Jul. 21, 1993

[51] Int. Cl.⁶ ............................................. B01D 61/48
[52] U.S. Cl. ............................... 204/182.4; 204/182.5; 204/301; 210/321.6
[58] Field of Search .................. 204/301, 182.4, 182.5, 204/151; 210/321.6

[56] References Cited

U.S. PATENT DOCUMENTS

| | | | |
|---|---|---|---|
| 2,777,811 | 1/1957 | McRae et al. | 204/151 |
| 2,826,544 | 3/1958 | Dewey, II | 204/301 |
| 2,891,900 | 6/1959 | Kollsman | 204/301 |
| 3,294,671 | 12/1966 | Brown et al. | 204/301 |
| 3,554,376 | 1/1970 | Kunz | 210/189 |
| 3,761,386 | 9/1973 | Smith | 204/301 |
| 4,204,930 | 5/1980 | Ono et al. | 204/180 |
| 4,207,157 | 6/1980 | Hirai et al. | 204/180 |
| 4,256,559 | 3/1981 | Ono et al. | 204/180 |
| 4,313,808 | 2/1982 | Idemoto et al. | 204/180 |
| 4,330,386 | 5/1982 | Korinelt et al. | 204/223 |
| 4,525,259 | 6/1985 | Horn et al. | 204/182.4 |
| 4,608,140 | 8/1986 | Goldstein | 204/182.3 |
| 4,636,296 | 1/1987 | Kunz | 204/182.5 |
| 4,698,142 | 10/1987 | Muroi et al. | 204/182.3 |
| 4,737,260 | 4/1988 | Strathmann et al. | 204/301 |
| 4,750,983 | 6/1988 | Foster et al. | 204/301 |
| 4,781,809 | 11/1988 | Falcone, Jr. | 204/182.4 |
| 4,911,847 | 3/1990 | Shmidt et al. | 210/650 |
| 5,120,445 | 6/1992 | Colman | 210/640 |
| 5,292,422 | 3/1994 | Liang et al. | 204/301 |

FOREIGN PATENT DOCUMENTS

| | | |
|---|---|---|
| 2001291 | 5/1990 | Canada. |
| 0006006 | 12/1979 | European Pat. Off. . |
| 219083 | 4/1987 | European Pat. Off. . |
| 3022305 | 12/1980 | Germany . |
| 1119708 | 10/1984 | U.S.S.R. . |
| WO-A-9102555 | 3/1991 | WIPO ......................... B01D 65/08 |

OTHER PUBLICATIONS

*Journal of Membrane Science,* vol. 80, 2 Jun. 1993, Amsterdam, pp. 35–47, XP00453641, H. B. Winzeler et al., "Enhanced Performance for Pressure-Driven Membrane Processes: The Argument for Fluid Instabilities".

*Primary Examiner*—John Niebling
*Assistant Examiner*—Arun S. Phasge
*Attorney, Agent, or Firm*—Charles E. Snee, III

[57] ABSTRACT

A method and apparatus for recovering of ions present in a pressurized fluid stream. The apparatus comprises at least one ion exchange chamber having a first passage for providing fluid communication between the at least ion exchange chamber and the pressurized fluid stream and a second fluid passage for allowing fluid to exit the at least one ion exchange chamber. The first and second passages being positioned such that a substantially spiral vortex is created in the pressurized fluid stream as it flows through the at least one ion exchange chamber.

21 Claims, 7 Drawing Sheets

CAPTIVE VORTEX HIGH AGITATION DEVICE

The present invention is directed to a captive vortex high agitation device which is particularly useful when used as an electrodialysis device for recovering of ions present in a pressurized fluid stream.

PRIOR ART ELECTRODIALYSIS DEVICES

Typical prior art electrodialysis devices include a pair of ionically permeable membranes between which a flow of fluid is typically provided. An electrical charge is provided across the membranes so as to produce a current flow therethrough which extracts ions from the raw stock fluid flow flowing between the membranes. In these devices fluid flow is typically in a single direction and is restricted so that the fluid flowing between the membranes bounces back and forth between the membranes as it flows between the membranes. This constricted flow results in concentration gradients or boundary layers being formed near the membrane surfaces. Effectively, these boundary layers add to the thickness of the membranes and to the electrical resistance of the cell. This generates an opposition to the flow of currents and ions, which also contributes to the inefficiency of the process and relatively large power consumption.

It is known that the efficiency of the device can be improved by reducing the thickness of the concentration gradient near the surface and thus increasing the rate of mass transfer between the membranes and the solutions. Typical prior art solutions suggested involve increasing the flow rate through the device. However, this solution tends to require an extremely large duct and the addition of small pressure pumps.

The present invention provides an improved device which has improved mass and/or heat transfer and efficiently converts some of the energy of the pressurized fluid into high speed internal fluid motion. The present invention also has the advantage of providing various degrees of freedom so that the hydraulic impedance of the device can be fitted easily to conventional plumbing and pumps.

SUMMARY OF THE INVENTION

In one aspect of the present invention there is provided an apparatus for recovering of heat or mass present in a pressurized fluid stream. The apparatus comprises at least one heat or mass exchange chamber having a first passage for providing fluid communication between the at least one heat or mass exchange chamber and the pressurized fluid and a second fluid passage for allowing fluid to exit the at least one heat or mass exchange chamber. The first and second passages are positioned such that a substantially spiral vortex is created in the pressurized fluid stream as it flows through the at least one ion exchange chamber.

In another aspect of the present invention there is provided an apparatus for recovering of ions present in a pressurized fluid stream. The apparatus comprises at least one ion exchange chamber having a first passage for providing fluid communication between the at least one ion exchange chamber and the pressurized fluid stream and a second fluid passage for allowing fluid to exit the at least one ion exchange chamber. The first and second passages being positioned such that a substantially spiral vortex is created in the pressurized fluid stream as it flows through the at least one ion exchange chamber.

In yet another aspect of the present invention there is provided a method of conducting electrodialysis in an electrodialysis apparatus having at least one ion exchange chamber. The at least one chamber having an ion permeable membrane defining at least a portion of the chamber, comprising the steps of:

introducing a fluid stream into the at least one ion exchange chamber so as to create a substantially spiral fluid vortex in the at least one ion exchange chamber such that the fluid circulates adjacent the permeable membrane in a substantially spiral vortex.

DETAILED DESCRIPTION OF THE PREFERRED EMBODIMENT

Figure 1:
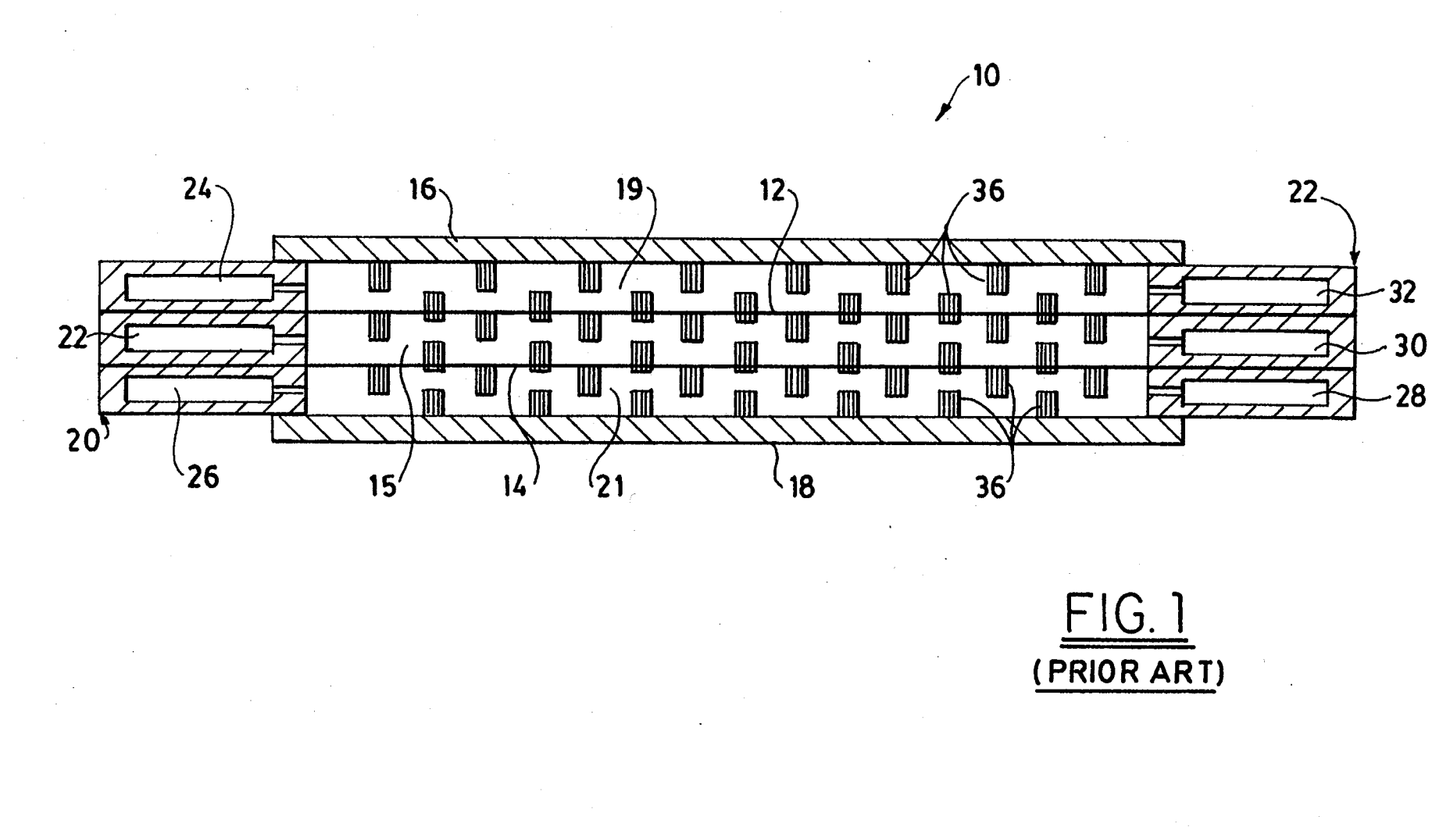
FIG. 1 is a cross-sectional view of an electrodialysis device made in accordance with the prior art.

Referring to FIG. 1 there is illustrated an electrodialysis device 10 made in accordance with the prior art. The device 10 includes a first ion permeable membrane 12 and a second permeable ion membrane 14 spaced apart so as to form a chamber 15 therebetween and to allow a fluid stream to pass therebetween. Typically, the membranes 12,14 are capable of exchanging their anions and cations with other anions and cations. However, any type desired membrane may used that is used in electrodialyzer and other similar type devices. The device 10 includes an anode 16 and cathode 18 disposed on opposite sides of the device 10 in spaced relationship with the adjacent membrane forming discharge chambers 19,21. The electrodialysis device 10 further includes an inlet manifold 20 and outlet manifold 22. Raw feed stock flows under pressure and is channeled into inlet port 23 of inlet manifold 20 so as to cause the fluid to flow between membranes 12,14. Additional wash/rinse fluid is provided at inlet ports 24,26 in manifold 20 for providing a first rinse fluid stream between the anode 16 and membrane 12 and a second rinse fluid stream between cathode 18 and membrane 14. Outlet manifold 22 is provided with outlets 28,30,32 for allowing fluid in chambers 21,15,19 to be discharged from the device 10. Thus, it can be seen that three separate fluid streams are flowing through device 10. A first fluid stream bringing raw fluid to be treated to inlet port 23 into chamber 15 and the resulting treated solution leaving chamber 15 through outlet 30. A second fluid flows through inlet 24 into chamber 19 and exits out outlet 32. A third fluid flows enters inlet 26 and passes into chamber 21 and exits chamber 21 through outlet 28. A plurality of projections 36 are provided in the path of each of the fluid streams so that each of the fluid streams will mix as it travels through each of the respective chambers.

A problem with such prior art devices is that relatively thick concentration gradients and boundary layers are developed near the membrane surfaces. These layers or concentration gradients reduce the efficiency of a flow of ions through the membranes thus increasing the power consumption of the device.

Figure 2:
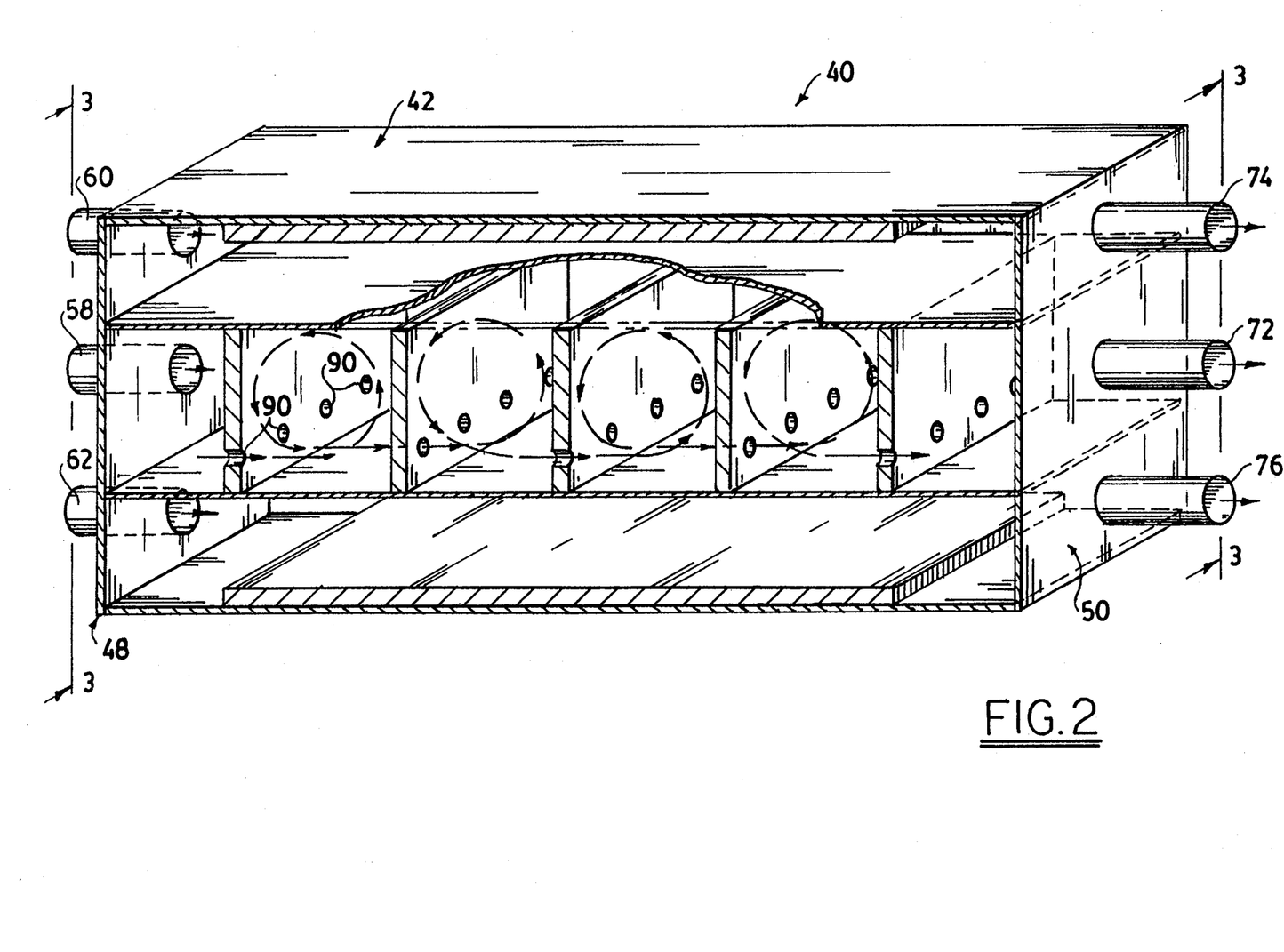
FIG. 2 is a perspective view, partially broken away, of an electrodialysis device made in accordance with the present invention.
Figure 3:
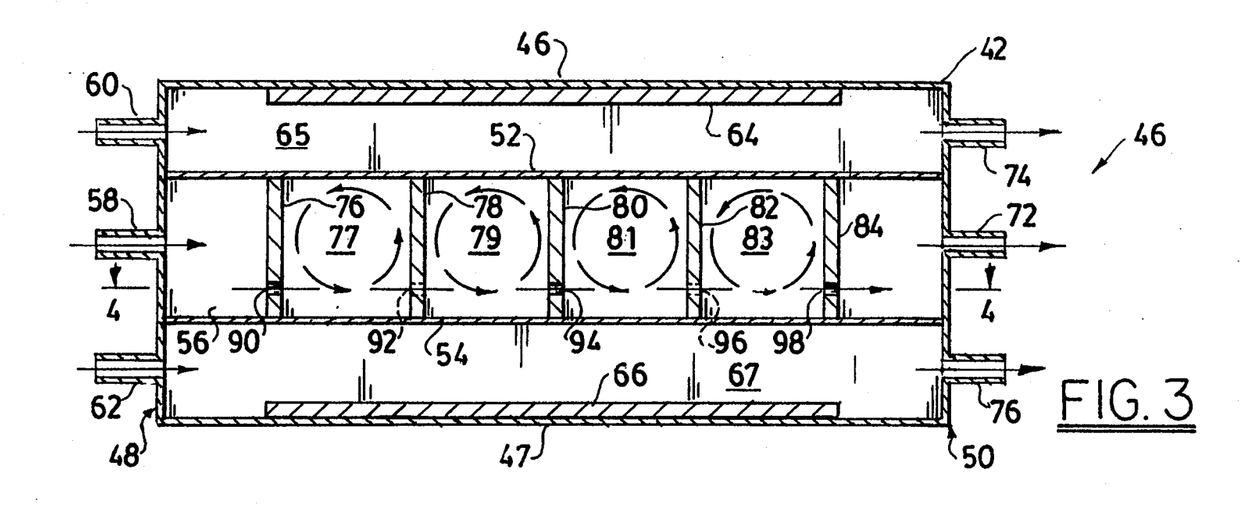
FIG. 3 is a cross-sectional view of the device of FIG. 2 as taken along line 3—3.
Figure 4:
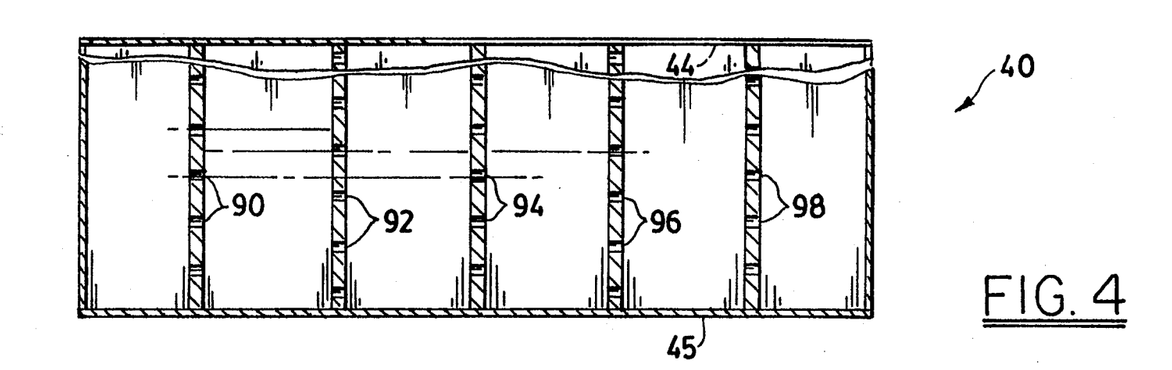
FIG. 4 is a cross-sectional view of the device of FIG. 2 as taken along line 4—4.

Referring to FIGS. 2-4, there is illustrated an electrodialysis device 40 made in accordance with the present invention. The device includes a housing 42 having a pair of side walls 44,45, a top wall 46 and bottom wall 47. An inlet manifold 48 is provided at one end of the housing 42 and an outlet manifold 50 is provided at the opposite end of the housing 42. Device 40 further includes a first permeable membrane 52 through which ions may pass and a second permeable membrane 54 spaced from the membrane 52. The membranes 52,54 form a processing chamber 56 therebetween for treatment of a fluid stream.

The inlet manifold 48 includes an inlet port 58 for receiving a first fluid to be treated under pressure. The inlet manifold 48 further includes a pair of wash/rinse inlet ports 60,62 which are each connected to an appropriate source of rinse fluid. An anode 64 is provided in space relationship with the first permeable membrane 52 so as to form a first wash chamber 65 therebetween. A cathode 66 is also provided in spaced relationship to permeable membrane 54 forming a second wash/rinse chamber 67 therebetween. Wash chambers 65,67 are designed to remove ions that have been removed from the fluid stream being treated. An outlet manifold 70 is provided for channeling of the fluid streams leaving chambers 56,65,67. In particular, outlet manifold is provided with a first outlet port 72 for allowing treated fluid to pass out of the device 40 and a second outlet port 74 for removing the fluid stream from chamber 65 and a third outlet port 76 for allowing passage of the fluid stream from chamber 67. The inlet and outlet ports 58,60,62,72,74,76 in the embodiment illustrated have a substantially circular cross-sectional shape. However, the cross-sectional shape may be varied as desired.

A plurality of separating walls 76,78,80,82,84 are provided between membranes 52,54 forming a plurality of adjacent treatment chambers 77,79,81,83. Thus, each treatment chamber is bounded by a pair of separating walls and permeable membranes 52,54. The separating walls 76,78,80,82,84 are each provided with a plurality of openings/passages 90,92,94,96,98, respectively, for permitting the fluid to flow from inlet manifold 48 through the adjacent chambers and exit outlet manifold 50. In particular, the opening 90 in wall 78 places the first treatment chamber 77 in fluid communication with the inlet port 58 of the inlet manifold 48. The openings 90 are sized and spaced so as to generate a high velocity jet stream into the treatment chamber 77 such that a swirling vortex of the fluid being treated is formed within the treatment chamber 77. The openings 90 preferably are provided at substantially equal spaced distance from each other and adjacent to either the permeable membrane 52 or 54. In the particular embodiment illustrated, forty-seven openings 90 are provided in wall 76 which are spaced about ¼ inch (0.635 cm) apart. The size and shape of openings 90 may be varied as desired so as to provide the desired fluid vortex velocity. In the embodiment illustrated, the openings 90 in wall 76 are each substantially circular in cross-sectional shape and have a diameter of about 0.060 inches (0.1524 cms). The fluid stream is introduced at the inlet port 58 at a pressure of about 0.522 psi. Therefore, the size and shape of openings 90 will vary in accordance to the inlet fluid pressure and the desired fluid vortex velocity desired. The remaining plurality of openings 92,94,96,98 are similarly sized and are provided in their respective walls 78,80,82,84 so that a high velocity swirling vortex fluid stream is provided in each of the treatment chambers. In particular, the openings in each successive wall are offset such that they are positioned about midway between the opening in the adjacent walls. That is, the openings 92 in wall 78 are midway between openings 90 in wall 78. This pattern is repeated as best seen by the center lines shown in FIG. 4. In the preferred embodiment illustrated, forty-seven openings are provided in walls 76,78,80,82,84 which provide a swirling vortex in each treatment chamber. However, any desired number of connecting openings may be provided in each wall and in any desired pattern so long as a substantially swirling vortex is formed in each chamber. For example, but not by way of limitation, a single opening may be provided in the central region of the first treatment chamber and a pair of outlets may be provided at the sides for allowing fluid to flow into the next adjacent chamber. The single outlet could be provided in the central area for providing flow into the third treatment chamber. This sequence may then be repeated. Also various other patterns may be selected as desired in order to provide the swirling vortex fluid flow.

In order to maintain a swirling vortex in a device made in accordance with the present invention, the Reynolds Number (Re) is preferably equal to or greater than about 3,000. In the embodiment illustrated, the Reynolds Number is about 18,520. Given this, it is readily apparent that the appropriate fluid pressure for the treatment fluid can be calculated knowing the following relationships:

$$V = Re * \frac{v}{\delta * H}$$

$$\Delta P = .5\delta * V^2$$

wherein:
V = Velocity
Re = Reynolds Number
v = viscosity
H = height of chamber
δ = density
ΔP = Pressure drop across each dividing wall.

By determining the required velocity and the pressure drops across the dividing walls, the appropriate size openings and inlet pressure can be relatively simply calculated by one of ordinary skill in the art. Alternatively, by simple trial and error, one can determine the appropriate condition needed to obtain spiral vortex flow within each of the chambers.

Figure 5:
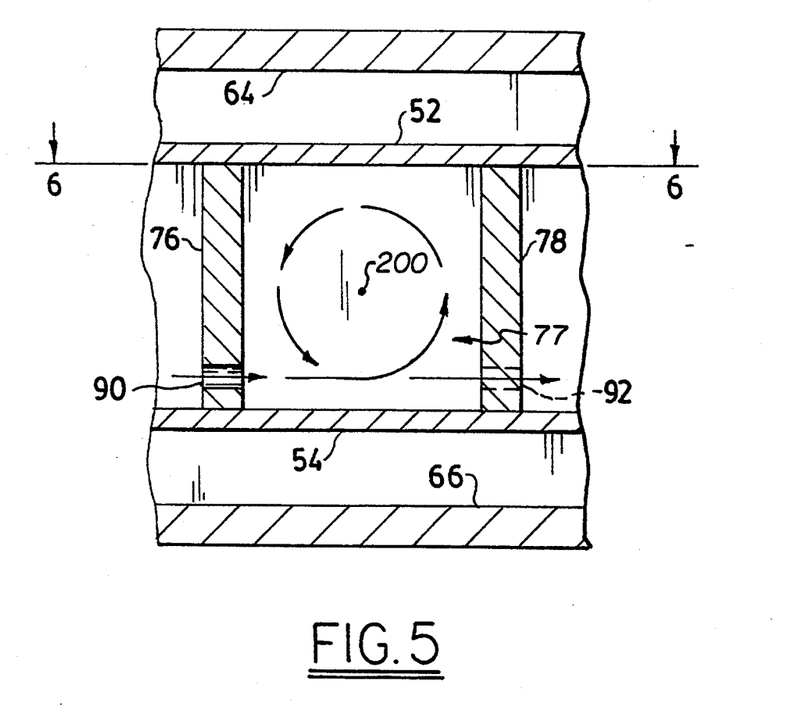
FIG. 5 is an enlarged partial elevational view of one of the cells illustrated in FIG. 3.
Figure 6:
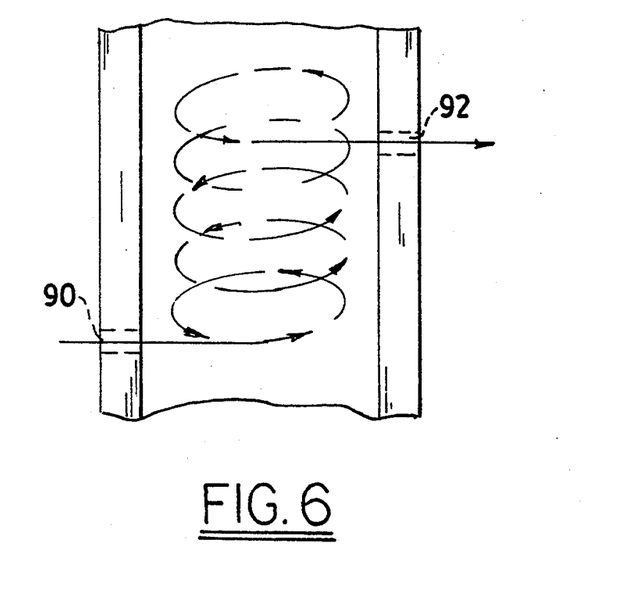
FIG. 6 is top view of the cell of FIG. 5 as taken along line 6—6.
Figure 10:
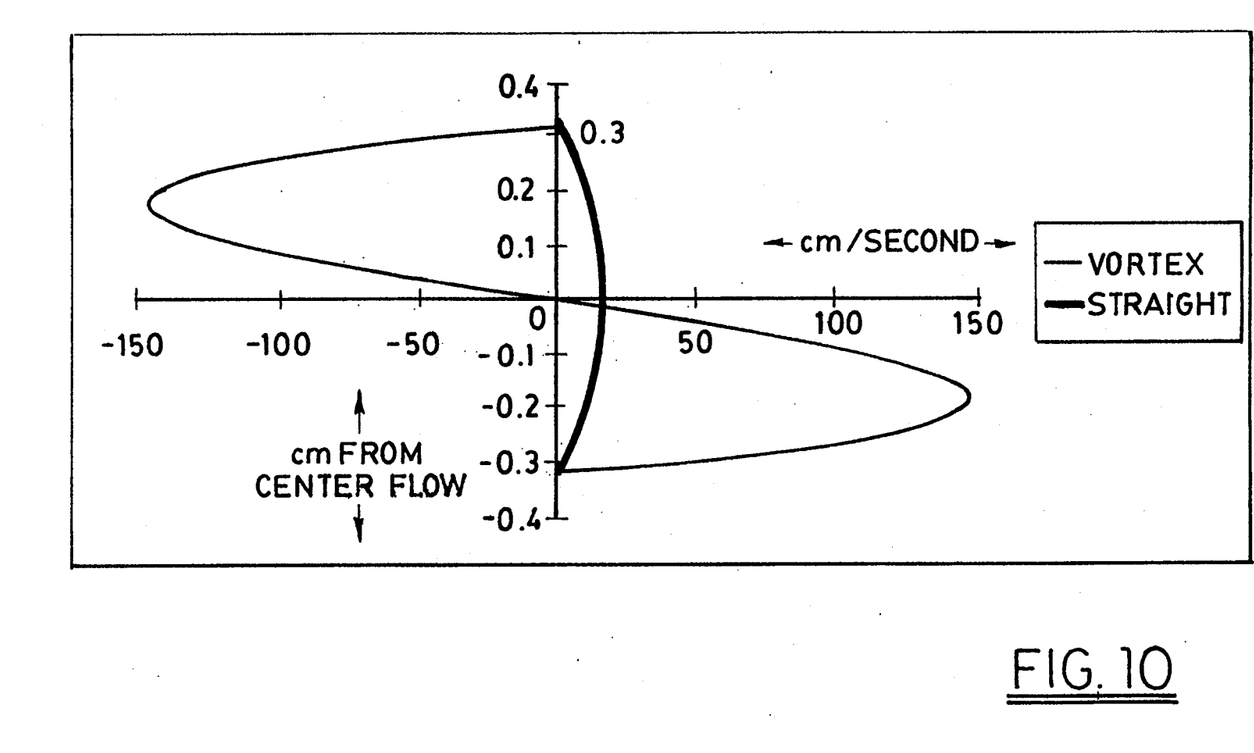
FIG. 10 is a graph illustrating the velocity of the fluid plotted the distance across the treatment chamber of a device made in accordance with the present invention as compared to a device made in accordance with the prior art.

By properly positioning and sizing the openings 90,92,94,96,98, spiral vortexes in the fluid stream are provided in each of the treatment chambers. For the sake of clarity, the action of the fluid within chamber 77 will be described in detail, it being understood that similar fluid movement occurs in each of the adjacent treatment chambers. In particular, the fluid, as it enters chamber 77 through openings 90, FIG. 5 is closely adjacent permeable membrane 54. Thereafter, the fluid will travel in a pattern closely adjacent to each of the bounding walls of the treatment chamber as illustrated by the arrows. The fluid travels in a generally spiral manner in a vortex having an axis 200, until the fluid reaches the plurality of openings 92 in wall 78 wherein the fluid stream goes into the next adjacent treatment chamber 79. The velocity of the fluid within the treatment chamber is quite high. In the embodiment illustrated, the average fluid velocity would be about 73 cm/sec. Referring to FIG. 10, there is illustrated the velocity distribution of the fluid in a treatment chamber made according to the present invention (curve identified by "vortex") as opposed to the fluid distribution of a device made in accordance with the prior art (curve identified by "straight") which uses a pair of spaced plates where the fluid flows straight through the treatment chamber. Applicants have found that the average velocity of the fluid of a device of the present invention may be more than $7\frac{1}{2}$ times the average velocity that would occur in a typical prior art device wherein separating plates are used. It should be noted that the rate of flow of the fluid in the treatment chamber of the device according to the present invention, down the axis of the vortex, is relatively small so that the fluid contacts the surface of the treatment chamber many times which results in high mass transfer coefficients. The high velocity which occurs minimizes the boundary layer formation at the surface. This has the significant advantage of reducing the boundary layer. It has been calculated that the fluid boundary layer adjacent the inner surface of the treatment chamber would be about 23 microns as opposed to a fluid boundary layer of about 290 microns in a prior art device which utilizes a pair of opposed plates.

Figure 7:
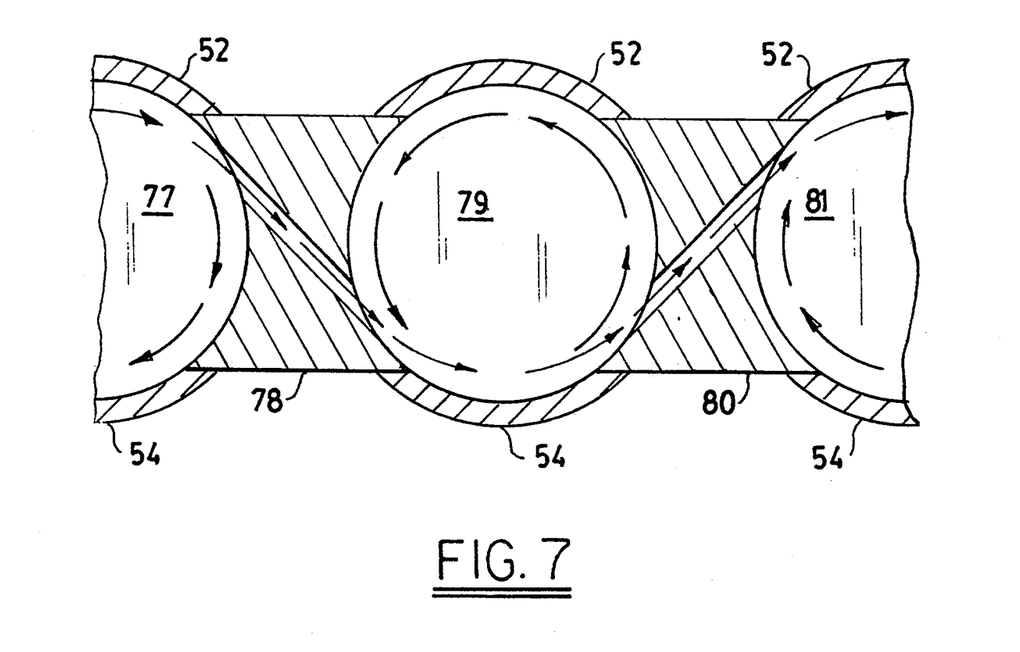
FIG. 7 is an enlarged partial elevational view of a modified cell made in accordance with the present invention.
Figure 8:
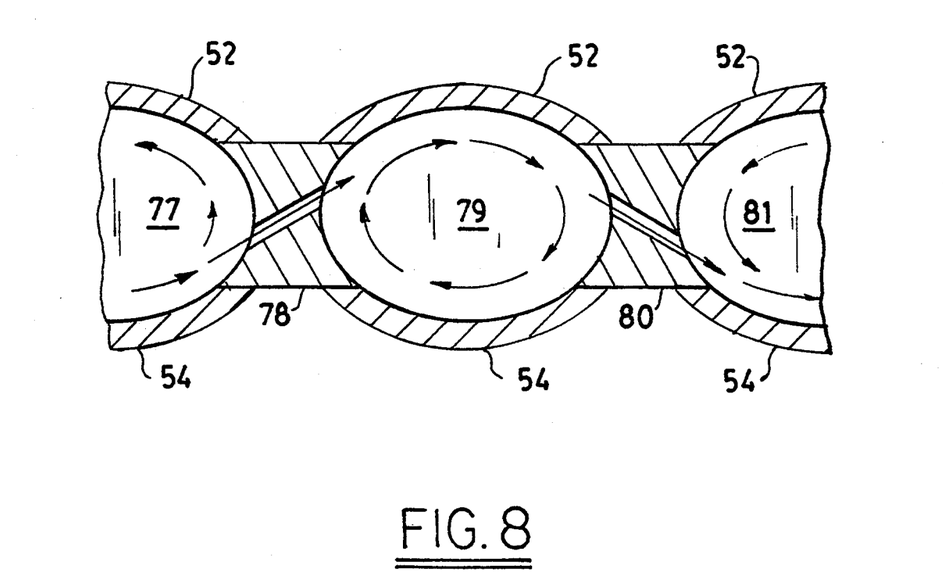
FIG. 8 is an enlarged partial elevational view of another modified cell made in accordance with the present invention.

In the embodiment illustrated, the treatment chambers each have a substantially square cross-sectional shape having a length L of about 0.25 inches (0.635 cms). This substantially square configuration assists in providing the spiral vortex and is still easy to manufacture and assemble. However, the cross-sectional configuration of the treatment chamber may take other configurations so desired, for example, a substantially circular shape as illustrated in FIG. 7, or oval as illustrated in FIG. 8. In these embodiments, like numerals representing like parts as previously discussed, the connecting passages would preferably be oriented so as to oriented in a direction close to the direction of the fluid vortex.

While in the particular embodiment illustrated four treatment chambers are illustrated, it is to be understood any number of treatment chambers may be provided so long as there is at least one treatment chamber.

In the preferred embodiment illustrated the swirling vortex fluid is provided in an electrodialysis device, the present invention may be applied to other devices, for example, but not by way of limitation, a heat exchanger, where instead of mass transfer, heat transfer will occur between the treatment chamber and adjacent heat exchange chamber or chambers. The present invention is also useful in removing excess ions from photographic solutions, for example, bromide ions from a developer solution.

Figure 9:
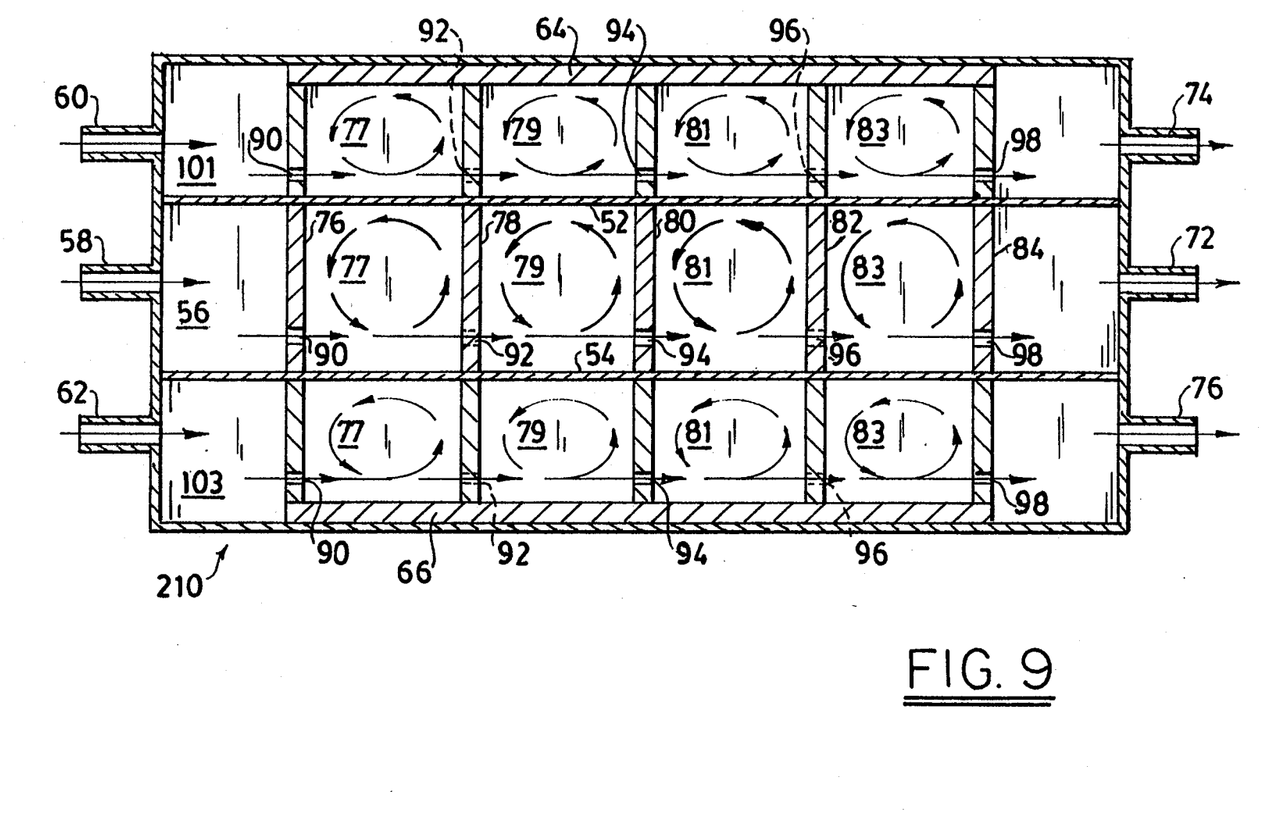
FIG. 9 is a cross-sectional view similar to FIG. 3 of yet still another modified device made in accordance with the present invention.

Referring to FIG. 9, there is illustrated yet still another modified device 210 made in accordance with the present invention, like numerals representing like parts, as previously discussed. In this embodiment the rinse fluid flowing through the rinse chamber is also caused to flow in the swirling vortex by the providing of a plurality of chambers 101,103. The chambers 101,103 being constructed in a similar manner as chamber 56 each having treatment chambers 77,79,81,83. Thus, the rinse fluids will also benefit from the high agitation.

Another advantage provided by a device made in accordance to the present invention is that the swirling vortex provides a self-cleaning affect. That is, due to the high fluid agitation, deposits and other build up along the surface of the chamber in minimized or eliminated.

The present invention provides an improved device which has improved mass and/or heat transfer and efficiently converts some of the energy of the pressurized fluid into high speed internal fluid motion. The present invention also has the advantage of providing various degrees of freedom so that the hydraulic impedance of the device can be fitted easily to conventional plumbing and pumps.

It is to be understood that various other changes and modifications may be made without departing from the scope of the present invention, the present invention being defined by the following claims.

I claim:

1. An apparatus for recovering of ions present in a pressurized fluid stream comprising:
   a generally flat anode and cathode located in planes on opposite sides of the apparatus;
   a plurality of ion exchange chambers between said anode and cathode;
   a plurality of connecting passages provided in said plurality of ion exchange chambers for fluidly connecting said plurality of chambers in series and to a pressurized fluid stream, said connecting passages being positioned such that a substantially spiral vortex is created in said fluid stream in said plurality of ion exchange chambers; said vortex having an axis that is substantially parallel to the planes of said anode and cathode.

2. An apparatus according to claim 1 wherein each of said chambers has a first membrane wall and a second membrane wall, said anode is provided adjacent each of said first membrane walls and said cathode is provided adjacent each of the second membrane walls of said plurality of ion exchange chambers.

3. An apparatus according to claim 2 wherein the connecting passages are located such that the fluid stream enters closely adjacent one of said membrane walls and leaves the ion exchange chamber closely adjacent one of said membrane walls.

4. An apparatus according to claim 2 wherein said ion exchange chambers each have a cross-sectional length of about 0.635 cms and a cross-sectional height of about 0.635 cms.

5. An apparatus according to claim 1 wherein each of said plurality of ion exchange chambers have a substantially square cross-sectional configuration.

6. An apparatus according to claim 1 wherein said passages have a substantially circular cross-sectional configuration and diameter of about 0.060 inches (0.1542 cms).

7. An apparatus according to claim 1 wherein said fluid stream is introduced at said entrance chamber at a pressure of about 0.522 kg/cm$^2$.

8. An apparatus for recovering of ions present in a pressurized fluid stream comprising:
- a generally fiat anode and cathode located in planes on opposite sides of the apparatus;
- a plurality of ion exchange chambers between said anode and cathode, said plurality of ion exchange chambers comprising an entrance chamber and an exit chamber, said entrance chamber having at least one first passage for providing fluid communication between the entrance chamber and said pressurized fluid stream and at least one second passage for allowing said pressurized fluid to exit said entrance chamber, said at least one first and second passages being positioned such that a spiral vortex fluid flow pattern is created in said entrance ion exchange chamber, said exit chamber having at least one third passage for allowing fluid to exit and at least one connecting passage is provided between said plurality of ion exchange chambers such that fluid will flow serially through said plurality of chambers from said entrance chamber to said exit chamber, said at least first, second, third and connecting passages having a configuration and placement such that a substantially spiral vortex is created in said pressurized fluid stream as it flows in said chambers; said vortex having an axis that is substantially parallel to the planes of said anode and cathode.

9. An apparatus according to claim 8 wherein each of said chambers has a first membrane wall and a second membrane wall, said anode is provided adjacent each of said first membrane walls and said cathode is provided adjacent each of the second membrane walls of said plurality of ion exchange chambers.

10. An apparatus according to claim 9 wherein said fluid stream is introduced at said entrance chamber at a pressure of about 0.522 kg/cm$^2$.

11. An apparatus according to claim 9 wherein said ion exchange chambers each have a cross-sectional length of about 0.250 inches (0.635 cms) and a cross-sectional height of about 0.250 inches (0.635 cms).

12. A method of conducting electrodialysis in an electrodialysis apparatus having a generally flat anode and Cathode located in planes on opposite sides of the apparatus; and at least one ion exchange chamber between said anode and cathode, said at least one chamber having an ion permeable membrane defining at least a portion of said chamber, comprising the steps of:
- introducing a fluid stream in said at least one ion exchange chamber so as to create a substantially spiral fluid vortex in said at least one ion exchange chamber such that the fluid circulates adjacent said permeable membrane in a substantially spiral vortex; said vortex having an axis that is substantially parallel to said anode and cathode.

13. An apparatus for recovering of ions present in a pressurized fluid stream comprising:
- a generally flat anode and cathode located in planes on opposite Sides of the apparatus;
- at least one ion exchange chamber between said anode and cathode and having at least one entrance passage for providing fluid communication between said at least ion exchange chamber and said pressurized fluid and at least one exit passage for allowing fluid to exit said at least one ion exchange chamber, said entrance and exit passages being positioned such that a substantially spiral vortex is created in said pressurized fluid stream as it flows through said at least one ion exchange chamber; said vortex having an axis that is substantially parallel to the planes of said anode and cathode.

14. An apparatus according to claim 13 wherein said at least one ion exchange chamber further comprises a first membrane wall and a second membrane wall, said anode being provided adjacent said first membrane wall and said cathode being provided adjacent the second membrane wall.

15. An apparatus according to claim 14 wherein the entrance and exit passages are located such that the fluid stream enters closely adjacent one of said membrane walls and leaves said chamber closely adjacent one of said membrane walls.

16. An apparatus according to claim 13 wherein said at least one exchange chamber having a substantially square cross-sectional configuration.

17. An apparatus according to claim 13 wherein said entrance and exit passages each have a substantially circular cross-sectional configuration and diameter of about 0.060 inches (0.1524 cms).

18. An apparatus according to claim 13 wherein said fluid stream is introduced into at least one ion chamber at a pressure of about 0.522 kg/cm$^2$.

19. An apparatus according to claim 13 wherein said at least one ion exchange chamber has a cross-sectional length of about 0.25 inches (0.635 cms) and a cross-sectional height of about 0.25 inches (0.635 cms).

20. An apparatus according to claim 13 wherein ions are recovered from a photographic solution.

21. An apparatus according to claim 20 wherein said photographic solution is a developer solution and said ions are bromide ions.

* * * * *